US011866312B1

(12) United States Patent
Ellis

(10) Patent No.: US 11,866,312 B1
(45) Date of Patent: Jan. 9, 2024

(54) NEEDLE ACTUATOR FOR CARTRIDGE FILLING MACHINE

(71) Applicant: Credence Engineering, Inc., Tempe, AZ (US)

(72) Inventor: James Edward Ellis, Tempe, AZ (US)

(73) Assignee: Credence Engineering, Inc., Tempe, AZ (US)

( * ) Notice: Subject to any disclaimer, the term of this patent is extended or adjusted under 35 U.S.C. 154(b) by 0 days.

(21) Appl. No.: 18/183,704

(22) Filed: Mar. 14, 2023

(51) Int. Cl.

| | |
|---|---|
| ***B65B 3/26*** | (2006.01) |
| ***B67C 3/26*** | (2006.01) |
| ***B67C 3/28*** | (2006.01) |
| ***B65B 3/12*** | (2006.01) |
| ***B67C 3/00*** | (2006.01) |
| ***B65B 37/06*** | (2006.01) |
| *B65B 65/02* | (2006.01) |

(52) U.S. Cl.
CPC .................. *B67C 3/26* (2013.01); *B65B 3/12* (2013.01); *B65B 37/06* (2013.01); *B67C 3/007* (2013.01); *B67C 3/28* (2013.01); *B65B 65/02* (2013.01)

(58) Field of Classification Search
CPC B65B 3/12; B65B 37/06; B65B 65/02; B67C 3/26; B67C 3/007; B67C 3/28
See application file for complete search history.

(56) References Cited

U.S. PATENT DOCUMENTS 3,306,189 A * 2/1967 Alcamo ................. D06H 1/003 101/26
3,880,211 A * 4/1975 Gess ......................... B65B 3/12 141/183
5,479,968 A * 1/1996 Sanchez ............... B41J 2/17506 141/2
6,360,794 B1 * 3/2002 Turner ............... G01N 35/1079 141/130
8,667,996 B2 * 3/2014 Gonnelli ............... A61J 1/2089 604/407
8,807,177 B2 * 8/2014 Strangis ................ B63C 9/0005 604/416
9,475,597 B2 * 10/2016 Py ........................... B65B 51/22
10,440,989 B2 * 10/2019 Gardella ................. B65B 39/12

(Continued)

OTHER PUBLICATIONS

Cartridge Filler Machine Reviews, by Richard G., published on the Internet on Nov. 8, 2021, at URL address https://cartridgefillingmachines.com/2021/11/08/cartridge-filler-machine-reviews/.

(Continued)

*Primary Examiner* — Nicolas A Arnett
(74) *Attorney, Agent, or Firm* — Haynes and Boone, LLP

(57) ABSTRACT

Apparatus for automatically filling fluid into containers includes an actuator for raising and lowering a fluid dispensing needle. The needle is supported for vertical sliding movement. A first end of a pivot arm is engaged with a cam rotated by a motor for rocking the pivot arm. The dispensing needle is also engaged with the pivot arm for being raised or lowered thereby as the pivot arm rocks. The cam, which may be circular and eccentric, may be surrounded by a circular bearing and slidingly received within a yoke at the first end of the pivot arm. The needle is coupled to a pump. A first sensor senses that the needle has been moved to its lowered position. A control circuit responsive to the first sensor prevents the pump from pumping fluid to the needle unless the needle is in its lowered position.

12 Claims, 9 Drawing Sheets

(56) References Cited

U.S. PATENT DOCUMENTS

| | | | | |
|---|---|---|---|---|
| 10,443,589 | B2 * | 10/2019 | Goldbrunner | B67C 3/206 |
| 10,583,949 | B1 * | 3/2020 | Ellis | B65B 3/12 |
| 11,612,189 | B2 * | 3/2023 | Chao | B65B 3/003<br>131/328 |
| 2006/0266431 | A1 * | 11/2006 | Thilly | A61M 5/162<br>604/416 |

OTHER PUBLICATIONS

Cartridge Filling Machine, ATG Pharma, webpage archived on Feb. 9, 2023 at Archive.org at URL address https://web.archive.org/web/20230209064852/atgpharma.com/products/automatic/cartridge-filling-machine.

* cited by examiner

NEEDLE ACTUATOR FOR CARTRIDGE FILLING MACHINE

BACKGROUND OF THE INVENTION

Technical Field

The present invention relates generally to machines for filling an array of cartridges with fluids, and more particularly to an actuator for driving and controlling a fluid dispensing needle.

State of the Art

Electronic cigarettes, or e-cigarettes, have become popular among smokers who wish to avoid inhaling toxic byproducts of burning tobacco and the outer paper liner. These devices are typically battery-operated and are used by people to inhale vapors that typically contain nicotine. Such devices are also known as "vapes" or "vape pens". A liquid solution containing nicotine in an oil base, and possibly other ingredients such as flavorings, is packaged in a cartridge having a heater to atomize the liquid so that it can be inhaled. The cartridge is installed in a vape pen having a battery, and the battery supplies electrical power to the cartridge's heater for vaporizing the liquid solution stored in the cartridge.

The same principles of "vaping" have been applied to smoking of marijuana, or *cannabis*. Tetrahydrocannabinol, or "THC", is the main psychoactive compound contained in the *cannabis* plant that gives a sensation of being "high". THC can be consumed by smoking marijuana, but it is also available as *cannabis* oil, or "marijuana oil". Such oils are typically produced by extracting such oils from the *cannabis* plant using a solvent, and then refining the extracted composition, as by filtration and distillation or the like. This *cannabis* oil can then be vaporized in a heated cartridge, and inhaled, in a manner like that used for e-cigarettes.

Several manufacturers supply empty cartridges shipped in a support tray ready to be filled with nicotine-based solutions or *cannabis* oil. For example, Jupiter Research, LLC of Phoenix, Arizona, and Boldcarts of Tempe, Arizona, both sell empty cartridges supplied in a support tray having an array of ten rows by ten columns and providing 100 cartridges per support tray. Alternatively, some manufacturers provide empty cartridges inserted into a foam base, typically arranged in an array of ten rows by ten columns and providing 100 cartridges per foam base; references herein to a support tray should be understood to include a foam base as well. These cartridges include transparent cylindrical sidewall portions typically made of polycarbonate material, although such transparent cylindrical sidewall portions may also be made of glass. The cartridges are shipped pre-loaded in such support trays, with the open upper-ends of the cartridges ready to be filled. After filling, such cartridges are capped to prevent the filled fluid from leaking out; the installed cap often includes a mouthpiece used to inhale vapor after the cartridge is installed into a vape pen.

A number of manufacturers provide oil filling machines designed to fill the empty cartridges in an automated fashion. A tray of 100 empty cartridges is inserted into the automated filling machine. A needle used to inject a desired fluid, such as *cannabis* oil, is supported above the inserted tray of cartridges. The needle is aligned above each empty cartridge, either by moving the needle relative to the tray of cartridges, or by moving the tray of cartridges relative to the needle. Once aligned, the needle is typically lowered to the upper rim of the cartridge, oil is injected, the needle is raised, and the process is repeated for the next cartridge to be filled. One such automated filling machine is commercially available from ATG Pharma Inc. of Oakville, Ontario, Canada.

Applicant has found that problems frequently arise when using such automated filling machines. One such problem can arise due to misalignment of the cartridge tray and/or misalignment of cartridges within the cartridge tray. Often, one or more cartridges positioned in the lower support tray are not oriented in a truly vertical orientation, but rather extend at an angle. In other instances, the lower support tray is incorrectly aligned with the filling machine. In either case, as the filling needle is being lowered, the filling needle often impacts the upper rim of the cartridge, or fixtures used to support the cartridge, whereby the needle is never fully-lowered. In such instances, fluid is dispensed from the dispensing needle at least partially along the outside of the cartridge, or upon the supporting cartridge tray, rather than within a cartridge. As a result, the fluid being dispensed, which is often rather thick, oily and sticky, contaminates the cartridge tray and the base of the filling machine. When this happens, operation of the filling machine must be stopped to correct the error, and valuable time must be spent to clean up the mess resulting from fluid having been erroneously dispensed onto the cartridge support tray and the base of the filling machine. As a result, the production rate decreases.

In addition, currently available filling machines have limited production rates due to the amount of time required to lower the dispensing needle into a cartridge to be filled, and the amount of time required to raise the dispensing needle back up after filling one cartridge so that the dispensing needle can lowered into the next cartridge to be filled. Even one added second to each cycle of lowering and raising the dispensing needle translates into 100 additional seconds when filling a tray of 100 cartridges.

Accordingly, a solution is needed to help insure that fluid is not inadvertently dispensed when the dispensing needle was not fully lowered into a dispensing cartridge.

A dispensing needle actuator is also needed to raise and lower the dispensing needle in a quick, repeatable and reliable manner in order to maximize production rates achieved by the filling machine.

SUMMARY OF THE INVENTION

Briefly described, and in accordance with various embodiments thereof, a first aspect of the present invention relates to an automated filling machine for dispensing a fluid into a group of fluid containers. A dispensing pump has an inlet coupled to a source of fluid for pumping the fluid to an outlet of the dispensing pump. A dispensing needle is coupled to the outlet of the dispensing pump for dispensing fluid into one of the fluid containers. The dispensing needle is supported by a needle actuator for moving the needle between a raised position and a lowered position. A first sensor is provided for sensing that the dispensing needle has been moved to its fully-lowered position. A control circuit is provided for controlling the dispensing pump; the control circuit is responsive to the first sensor for preventing the dispensing pump from pumping fluid to the dispensing needle unless the dispensing needle has been moved to its fully-lowered position.

In a particular embodiment of the invention, a first magnet is coupled to the needle actuator for movement therewith. The first sensor is adapted to sense that the first magnet lies proximate to the first sensor for signaling that the dispensing needle is in its fully-lowered position.

In an alternate embodiment of the invention, a second sensor may be provided for sensing that the dispensing needle is in its fully-raised position. The needle actuator moves the dispensing needle generally along a vertical axis. A horizontal actuator may also be provided for moving the needle actuator in a horizontal plane for moving the dispensing needle between one container and another container. It is desired that the horizontal actuator be enabled to move the needle actuator only when the dispensing needle is in its fully-raised position. Accordingly, a second sensor is provided for sensing that the dispensing needle is in its fully-raised position. A control circuit is provided to control operation of the horizontal actuator, and the control circuit is responsive to the second sensor for preventing the horizontal actuator from moving the needle actuator in the horizontal plane unless the dispensing needle has been moved to its fully-raised position. In one such embodiment, a second magnet is coupled to the needle actuator for movement therewith; the second sensor is adapted to sense that the second magnet lies proximate to the second sensor for signaling that the dispensing needle is in its fully-raised position.

In an alternate embodiment of the invention, apparatus for raising and lowering a dispensing needle used to dispense a fluid into a group of containers includes a frame and a pivot arm rotatably coupled to the frame about a pivot axis, wherein the pivot arm has first and second opposing ends. A dispensing needle is coupled to the pivot arm for movement therewith. A motor is supported by the frame and includes a rotatable motor shaft. A cam is coupled to the rotatable motor shaft for being selectively rotated by the motor; the cam engages a first end of the pivot arm for causing the pivot arm to rotate about its pivot axis as the cam is rotated. Operation of the motor rotates the cam and moves the pivot arm to either raise or lower the dispensing needle.

In one such embodiment, the pivot axis is located between the first and second opposing ends of the pivot arm, and the dispensing needle is coupled to the second end of the pivot arm opposite to the first end of the pivot arm.

In a particular embodiment of the invention, a first vertical guide post is secured to the frame. A needle support bracket is provided for supporting the dispensing needle. The needle support bracket slidingly engages the first vertical guide post for movement along the first vertical guide post. The needle support bracket is coupled to the second end of the pivot arm for being raised and lowered thereby. In a further embodiment, a second vertical guide post is secured to the frame, and the needle support bracket slidingly engages the second vertical guide post for movement therealong.

In one embodiment of the invention, the cam has a circular periphery and is eccentrically mounted to the rotatable motor shaft. The first end of the pivot arm includes a yoke for receiving the cam. In a further embodiment, a circular bearing surrounds the cam for allowing the cam to rotate within the circular bearing. The circular bearing is slidingly received within the yoke of the pivot arm for sliding therein. In a still further embodiment of the invention, a cam limiter is disposed within the yoke of the pivot arm. The cam limiter includes an arcuate engagement surface adapted to engage the circular bearing for limiting sliding movement of the circular bearing toward the pivot axis of the pivot arm, thereby limiting further rotation of the cam and stopping further movement of the needle.

In a further embodiment, the invention relates to a method for raising and lowering a needle used to dispense a fluid into a plurality of containers. An eccentric cam is secured to the driveshaft of a motor. A pivot arm is secured for rotational movement about a pivot axis. A first end of the pivot arm is engaged with the eccentric cam. The needle is secured to a support bracket, and the support bracket is in turn supported for sliding movement along a substantially vertical axis. The second, opposing end of the pivot arm is engaged with the needle support bracket. The motor is operated to rotate the eccentric cam between a first rotational position and a second rotational position. Movement of the eccentric cam from its first rotational position to its second rotational position causes the pivot arm to rotate, or rock, in a first direction for lowering the second end of the pivot arm to lower the needle. Alternately, movement of the eccentric cam from its second rotational position to its first rotational position causes the pivot arm to rotate, or rock, in a second direction, opposite to the first direction, for raising the second end of the pivot arm to raise the needle. In some embodiments, the first rotational position and second rotational position are approximately 180 degrees apart from each other.

In some embodiments of the aforementioned method, the motor is operated to rotate the eccentric cam in a first rotational direction when rotating the cam from its first rotational position to its second rotational position, while the motor is operated to rotate the eccentric cam in a second, opposing rotational direction when rotating the cam from its second rotational position back to its first rotational position. In at least some embodiments, the method includes engaging the eccentric cam within a yoke formed in the first end of the pivot arm. Movement of the eccentric cam within such yoke toward the pivot axis of the pivot arm may intentionally be limited to prevent the eccentric cam from rotating beyond a certain angular position, as, for example, when the needle has been fully raised and/or when the needle has been fully lowered.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

DETAILED DESCRIPTION

Figure 1:
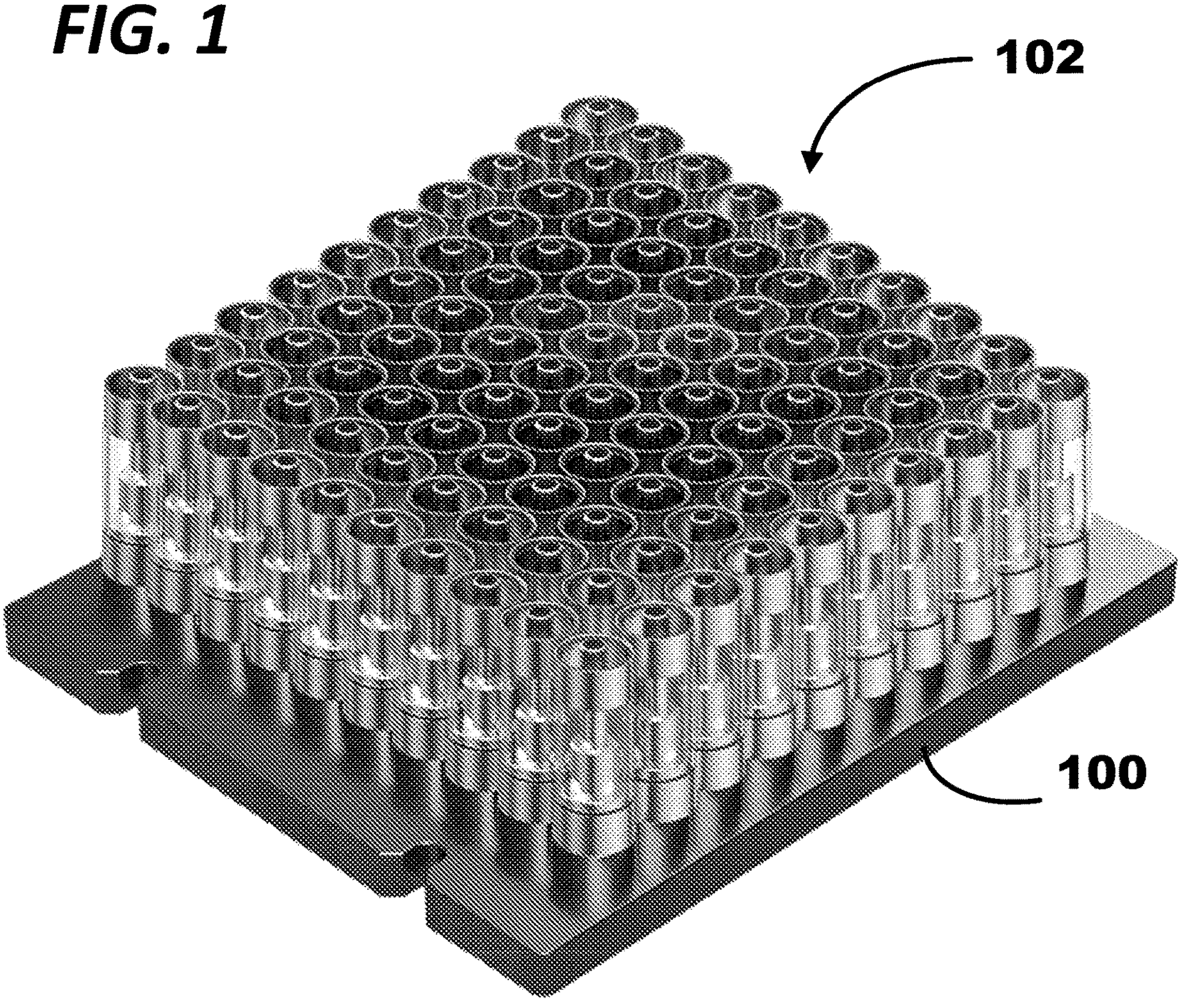
FIG. 1 is a perspective view of a support tray pre-loaded with one-hundred cartridges in a patterned array of ten rows by ten columns.

Shown in FIG. 1 is a conventional support tray 100 for supporting an array 102 of cartridges ready to be filled with a nicotine-containing e-cigarette solution, *cannabis* oil or the like. The array 102 of cartridges are supported in a patterned array of cartridge holding locations, for example, an array of ten rows and ten columns, formed in support tray 100. Support tray 100 and array 102 of cartridges may be of the type commercially available, for example, from Jupiter Research, LLC of Phoenix, Arizona. As mentioned above, support tray 102 may be in the form of a square block of punched foam material in which the array 102 of empty cartridges are inserted. Optionally, an upper stabilizing support tray of the type described in Applicant's co-pending U.S. patent application Ser. No. 17/845,903, filed Jun. 21, 2022, for "Upper Stabilizing Tray For Filling Cartridges And Related Method", may be positioned over array 102 of cartridges to maintain proper alignment and orientation of such cartridges during filling operations.

Figure 2:
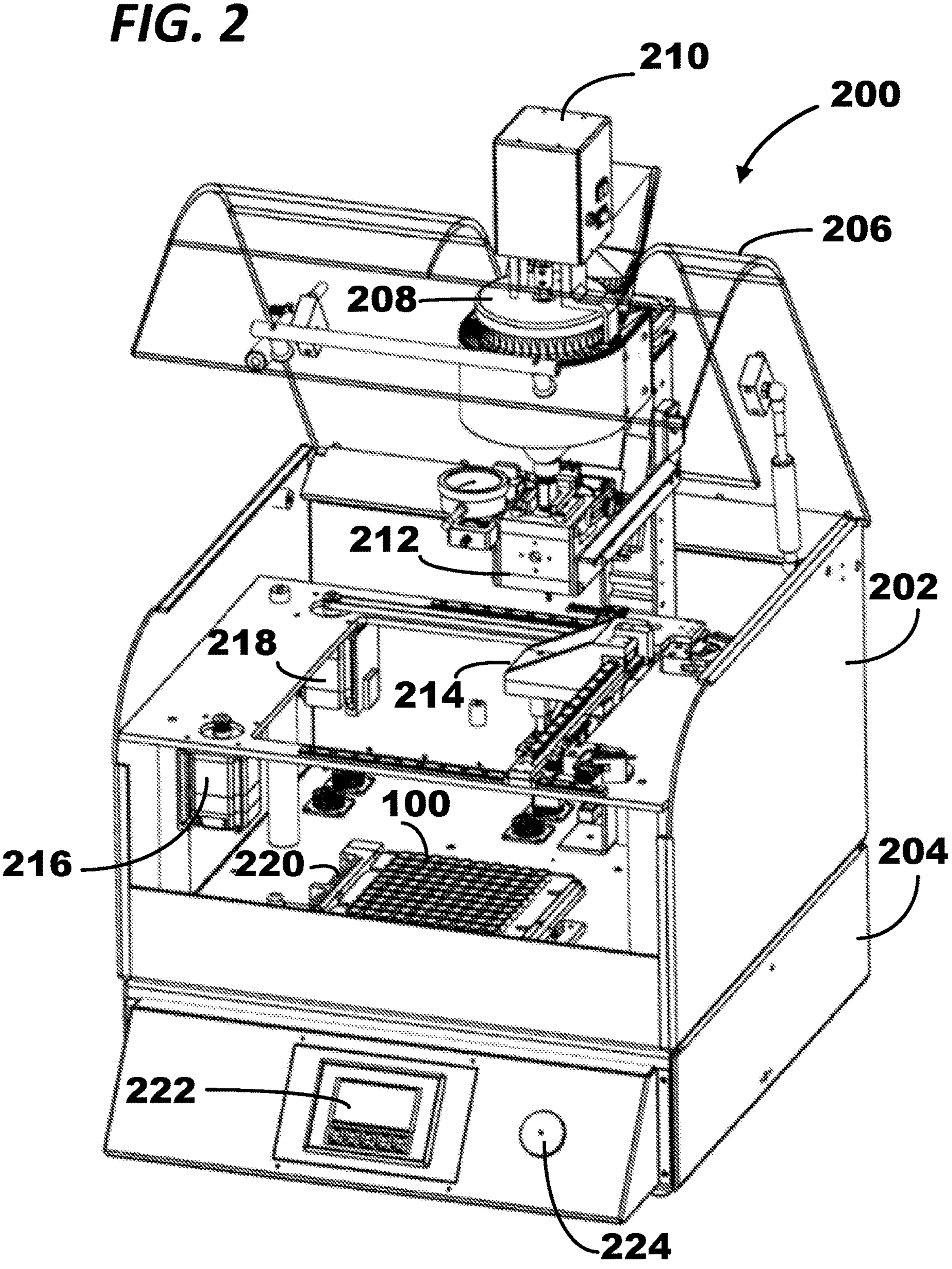
FIG. 2 is a perspective view of an automated cartridge filling machine constructed in accordance with one embodiment of the present invention.

Shown in FIG. 2 is an automated cartridge filling machine in accordance with one embodiment of the present invention. The automated cartridge filling machine is designated generally by reference numeral 200 and includes an upper cabinet 202 and a lower cabinet 204. Cartridge support tray 100 of FIG. 1 is shown disposed upon an elevator platform 220 near the bottom of upper cabinet 202. A hinged safety cover 206 is shown propped open above upper cabinet 202 to better illustrate internal components; safety cover 206 is lowered before machine 200 is put into operation. A fluid vessel 208 is supported near the top of machine 200 for containing fluid to be dispensed into cartridges 102; vessel 208 may include a heater for heating the fluid contained therein. A vessel stirring motor 210 is disposed above vessel 208 for continuously stirring the fluid inside vessel 208. Fluid pump 212 has an inlet coupled to an outlet of vessel 208 for receiving fluid to be dispensed. A needle actuator assembly 214 selectively lowers and raises a dispensing needle used to dispense fluid into cartridges 102. A fluid transfer tube (not shown) extends from an outlet of fluid pump 212 to needle actuator assembly 214 for supplying fluid from fluid pump 212 to dispensing needle 304 (see FIG. 3); such fluid transfer tube may optionally include a heating element and one or more temperature sensors for regulating the temperature of fluid within the transfer tube. Needle actuator assembly 214 is, in turn, supported by a carriage driven by Y-axis motor 216 and X-axis motor 218 for moving needle dispenser assembly in a horizontal X-Y plane from one cartridge to another. Also visible within FIG. 2 is an operator interface 222 including a visual display panel and a series of pushbuttons, as well as an emergency stop button 224 for powering off the unit in case of an emergency.

Figure 3:
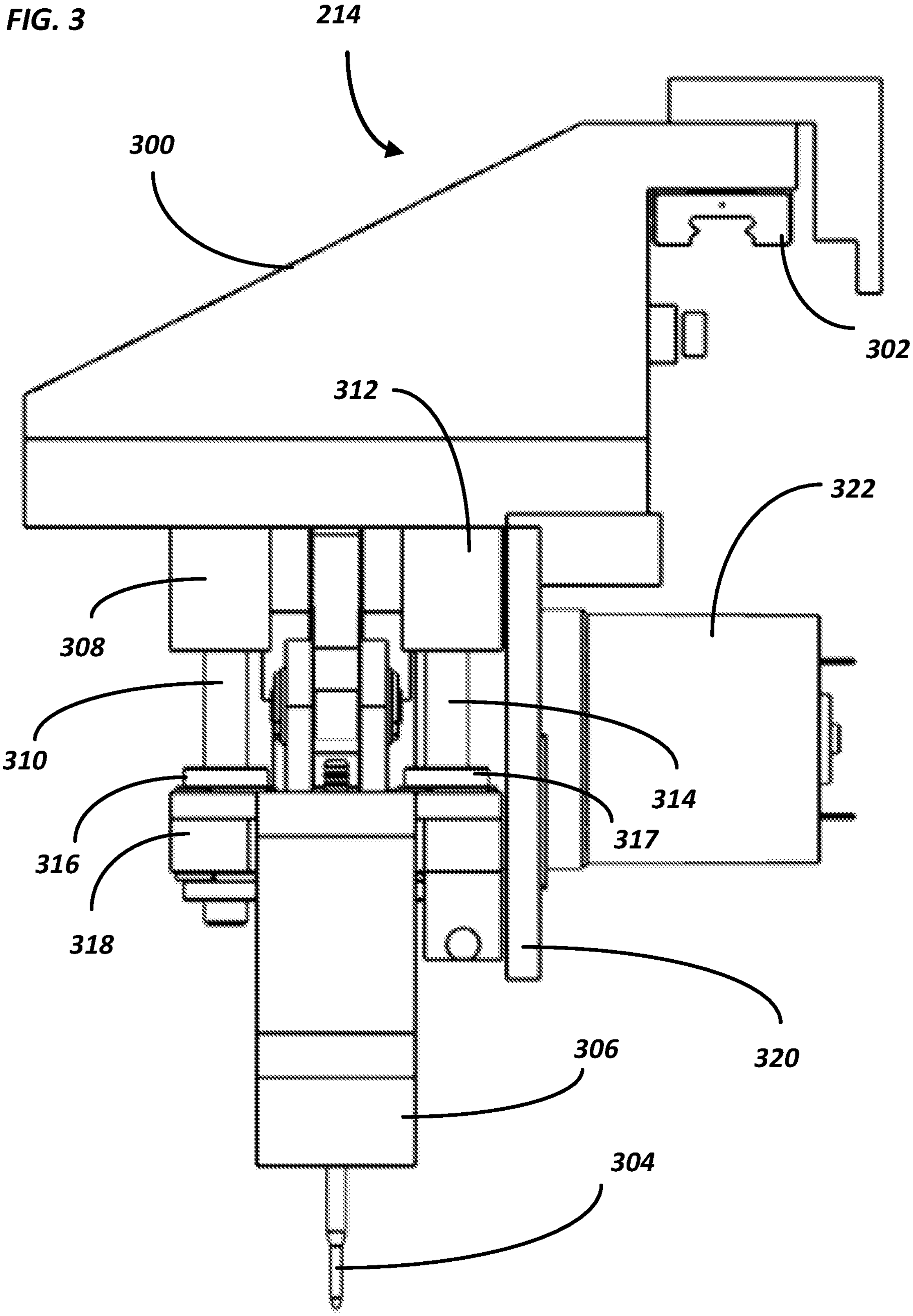
FIG. 3 is a frontal view of a needle actuator assembly for raising and lowering a needle used to inject fluid into empty cartridges.

In FIG. 3, needle actuator assembly 214 is shown in side view. Needle actuator assembly serves to raise and lower a needle used to dispense fluid into the cartridge array 102 shown in FIG. 1. Bracket 300 serves as a frame for supporting the components that form needle actuator assembly 214. Bracket 300 is itself secured to a ball bearing carriage 302 that slides along a Y-axis track in a manner to be described below for allowing the needle actuator assembly 214 to move within a horizontal plane. Extending downwardly from bracket 300 are a pair of pillars 308 and 312. A first guide shaft, or guide post, 310 extends downwardly from pillar 308 and a second guide shaft, or guide post, 314 extends downwardly from pillar 312. Fluid dispensing needle 304 extends downwardly from needle support bracket 306, which is in turn secured to plunger mount 318 for movement therewith. Plunger mount 318 includes a pair of linear bearings 316 and 317 which are seated within apertures formed in plunger mount 318. Linear bearings 316 and 317 slidingly receive first and second guide shafts 310 and 314, respectively, for guiding plunger mount 318 and needle support bracket 306 for upward and downward movement. Thus, needle support bracket 306 slidingly engages guide shafts 310 and 314 via plunger mount 318 for movement therealong. Also visible within FIG. 3 are a gearmotor 322 and a sensor support bracket 320, which are described in greater detail below.

Figure 4:
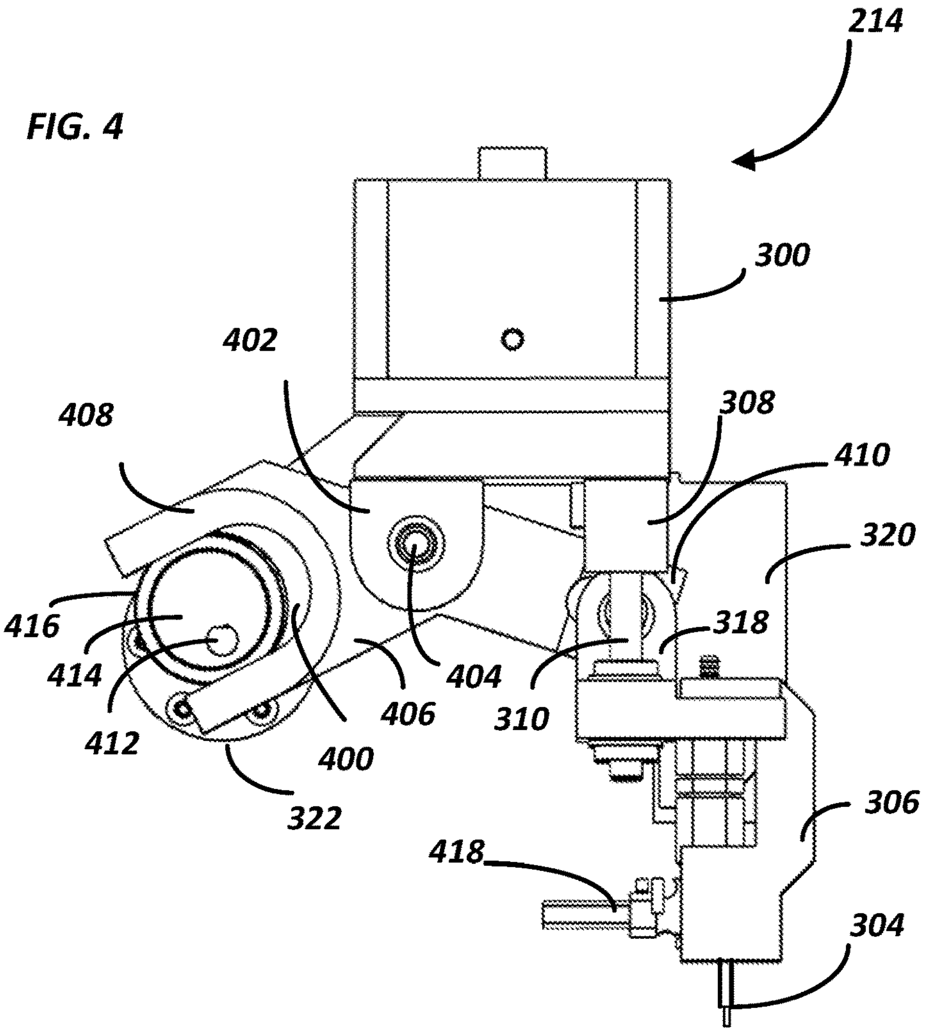
FIG. 4 is a side view of the needle actuator assembly of FIG. 3.

Now referring to FIG. 4, a frontal view of needle actuator assembly 214 shows that bracket 300 includes a first downwardly-depending collar or ear 402 having a bearing for rotatably supporting a pivot axle 404. While not visible in FIG. 4, bracket 300 includes a second ear spaced from first ear 402 for supporting an opposing end of axle 404. A pivot arm 406 is rotatably coupled to ear 402 of bracket 300 about pivot axle 404, whereby pivot arm 406 is rotatably coupled to bracket 300 about a pivot axis passing through pivot axle 404. Pivot arm 406 includes a first end 408 formed as a U-shaped yoke, as well as an opposing second end 410 engaged with plunger mount 318. Thus, fluid dispensing needle 304 is coupled to pivot arm 406, by way of needle support bracket 306 and plunger mount 318, for upward and downward movement as pivot arm 406 rocks back and forth. In this described embodiment, the pivot axis corresponding to pivot axle 404 is located between first end 408 and second end 410 of pivot arm 406, and dispensing needle 304 is coupled to second end 410 of pivot arm 406 opposite first end 410 of pivot arm 406; accordingly, when first end 408 moves upwardly, needle 304 moves downwardly. In other embodiments, the pivot axis of pivot arm 406 can be located at second end 410, and plunger mount 318 can be coupled to pivot arm 406 closer to its midpoint; in this case, however, the movement of needle 304 would be in the same direction, rather than in the opposite direction, of first end 408 of pivot arm 406.

Still referring to FIG. 4, pivot arm 406 is rocked clockwise, or counterclockwise, under the control of gearmotor 322. Gearmotor 322 is supported by motor mount 602 (see FIG. 6) extending from bracket 300, and includes a rotatable motor shaft, or driveshaft, 412 secured to a circular eccentric cam 414. Cam 414 is eccentrically mounted to driveshaft 412 and is rotated by gearmotor 322. Cam 414 has a circular periphery and is received within a circular bearing ring 416 which surrounds cam 414 and which allows cam 414 to rotate within bearing ring 416. Bearing ring 416 is slidingly received within a U-shaped yoke 408 formed in the first end of pivot arm 406. In FIG. 4, cam 414 is shown in its rotational orientation corresponding to needle 304 being fully lowered. Gearmotor 322, which may be a Model ZGA37RG DC gearmotor available from Zheng Electromotor of Yueqing, Zhejiang, China, can be controlled to rotate cam 414 in either a clockwise direction or in a counter-clockwise direction.

As shown in FIG. 4, pivot arm 406 includes a second, opposing end 410, which may have formed therein a smaller U-shaped yoke. The yoke formed in second end 410 of pivot arm 406 engages a horizontal axle secured to plunger mount 318. Thus, if pivot arm 406 raises second end 410, then plunger mount 318 and needle support bracket 306 are raised vertically along guide shafts 310 and 314. In contrast, if pivot arm 406 lowers second end 410, then plunger mount 318 and needle support bracket 306 are lowered vertically along guide shafts 310 and 314. Thus, cam 414 engages the first end 408 of pivot arm 406 for causing pivot arm 406 to rotate about pivot axle 404, whereby operation of gearmotor 322 rotates cam 414 and moves pivot arm 406 to raise and lower needle 304. Needle support bracket 306 is coupled, via plunger mount 318, to second end 410 of pivot arm 406 for being raised and lowered thereby.

Still referring to FIG. 4, if gearmotor 322 is operated to rotate eccentric cam 414 counterclockwise by approximately 180 degrees from the position shown in FIG. 4, then pivot arm 406 is rotated, or rocked, in a counterclockwise direction, thereby causing plunger mount 318 and needle support bracket 306 to be pulled upwardly along guide shafts 310 and 314, thereby raising needle 304 to its fully-raised position. Thereafter, gearmotor 322 can be operated to rotate eccentric cam 414 in the opposite, or clockwise, direction by approximately 180 degrees, back to the initial position shown in FIG. 4, lowering needle 304 back to its fully-lowered position.

Also visible in FIG. 4 is a pigtail 418 for receiving an electrical cable for supplying electrical current to a heating element incorporated within needle support bracket to heat needle 304 and fluid being dispensed thereby. While not shown, one or more temperature sensors may also be provided proximate to dispensing needle 304 for use in controlling such heating element to regulate the temperature of fluid within needle 304.

Those skilled in the art will appreciate that, as eccentric cam 414 rotates, its geometric center, and circular bearing 416, move within yoke 408 toward, or alternately away from, pivot axle 404 (the pivot axis of pivot arm 406). If desired, gearmotor 322 could be rotated in a single rotational direction, in increments of 180 degrees of rotation, to rock pivot arm 406 between its needle-raised and needle-lowered positions. Applicant has found that it is sometimes difficult to quickly and accurately stop eccentric cam 414 precisely at its needle-up position and/or at its needle-down position due to the rotational momentum of gearmotor 322, cam 414, bearing ring 416, pivot arm 406, plunger mount 318, and needle bracket 306.

Accordingly, as shown in FIG. 4, a crescent-shaped cam limiter 400 is preferably inserted within yoke 408 of pivot arm 406. The surface of cam limiter 400 that directly faces eccentric cam 414 and circular bearing 416 forms an arcuate engagement surface resembling the outer periphery of circular bearing 416 and adapted to engage the outer periphery of circular bearing 416. While cam limiter 400 is shown as a separate component, it could be made integral with yoke 408 if desired. Cam limiter 400 is dimensioned to engage the outer periphery of circular bearing 416 when eccentric cam 414 has been rotated in the counter-clockwise direction to its needle-up position. Once circular bearing 416 engages cam limiter 400, further sliding movement of circular bearing 416 within yoke 408 toward the pivot axis of pivot arm 406 is limited. Any attempt by eccentric cam 414 to further rotate (e.g., due to inertia) in the counterclockwise direction (and to advance closer to the pivot axis of pivot arm 406) is resisted by cam limiter 400, thereby maintaining eccentric cam 414 at its needle-up position, and thereby maintaining needle 304 at its needle-up position. Likewise, cam limiter 400 engages the outer periphery of circular bearing 416 when eccentric cam 414 has been rotated in the clockwise direction to its needle-down position. Any attempt by eccentric cam 414 to further rotate (e.g., due to inertia) in the clockwise direction (and to advance closer to the pivot axis of pivot arm 406) is resisted by cam limiter 400, thereby maintaining eccentric cam 414 at its needle-down position, and thereby maintaining needle 304 at its needle-down position.

Figure 5:
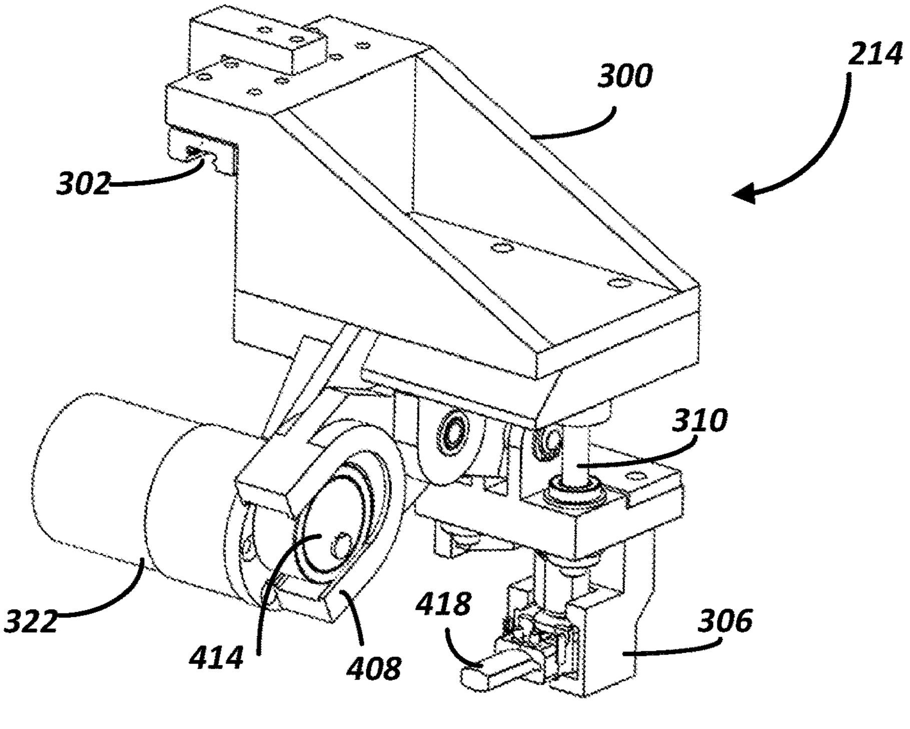
FIG. 5 is a perspective view of the needle actuator assembly of FIGS. 4 and 5.

FIG. 5 shows needle actuator assembly 214 from a different angle. Like reference numerals have been inserted in FIG. 5 to identify components previously described in FIGS. 2-4.

Figure 6:
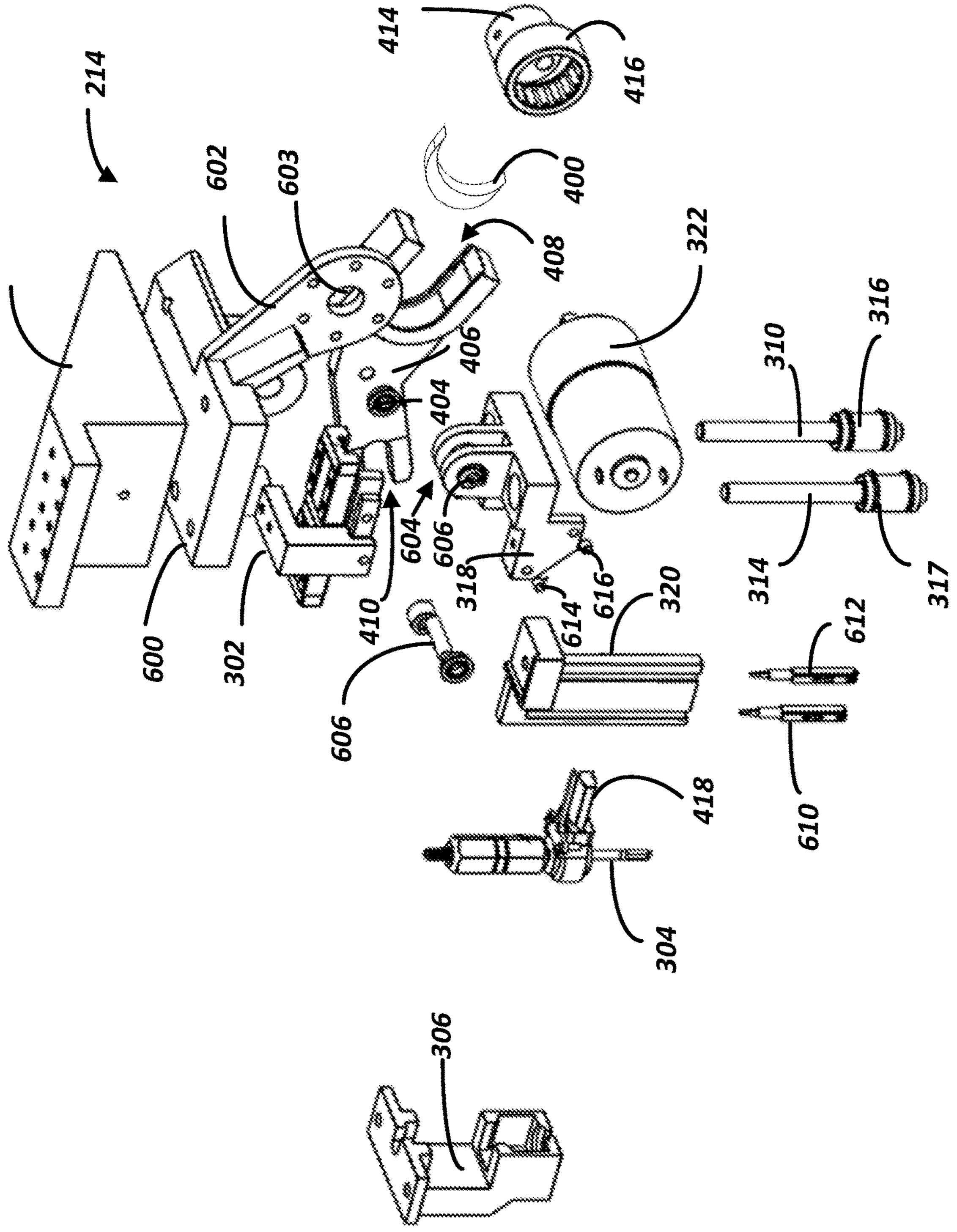
FIG. 6 is an exploded view of the needle actuator assembly of FIGS. 4-6.

In the exploded view of needle actuator assembly 214 shown in FIG. 6, bracket 300 is associated with frame member 600. Frame member 600 includes a motor mount 602 extending therefrom from which gearmotor 322 is supported. Frame member 600 includes a central hole 603 through which driveshaft 412 of gearmotor 322 may extend. Pivot arm 406 is also shown in FIG. 6, including the enlarged yoke 408 formed in its first end, and the smaller yoke 410 formed in its opposing second end. Also visible in FIG. 6 is eccentric cam 414, circular bearing 416 which surrounds eccentric cam 414 and which allows eccentric cam 414 to slide within enlarged yoke 408 of pivot arm 406, as well as the crescent-shaped cam limiter 400.

Still referring to FIG. 6, plunger mount 318 has a pair of upwardly directed spaced ears 604 for supporting horizontal pivot pin 606. The yoked end 410 of pivot arm 406 extends between ears 604 and engages pivot pin 606 to raise or lower plunger mount 318. Plunger mount 318 slides upwardly and downwardly along guide shafts 310 and 314 via linear bearings 316 and 317 respectively, which are secured in holes formed on either side of ears 604 in plunger mount 318. The upper ends of guide shafts 310 and 314 are anchored in mating holes formed in frame 600. Needle support bracket 306 is secured at its upper end to the underside of plunger mount 318 for supporting needle 304.

Also visible in FIG. 6 are needle-up magnet 614 and needle-down magnet 616 which are secured in corresponding holes formed in plunger mount 318. The upper end of sensor support bracket 320 is secured to the underside of frame 600 and extends downwardly therefrom. Needle down sensor 610 and needle up sensor 612 are adjustably secured within corresponding vertical tracks of sensor support bracket 320. When plunger mount 318 (and needle support bracket 306 along with needle 304 are fully lowered, then needle down magnet 614 lies opposite needle down sensor 610; alternatively, when plunger mount 318 (and needle support bracket 306 along with needle 304 are fully raised, then needle up magnet 616 lies opposite needle up sensor 612. Sensors 610 and 612 may be magnetic reed switches of the type available from SMC Corporation under part number D-M9B. These switches are normally open but close in the presence of a magnetic field.

Figure 7:
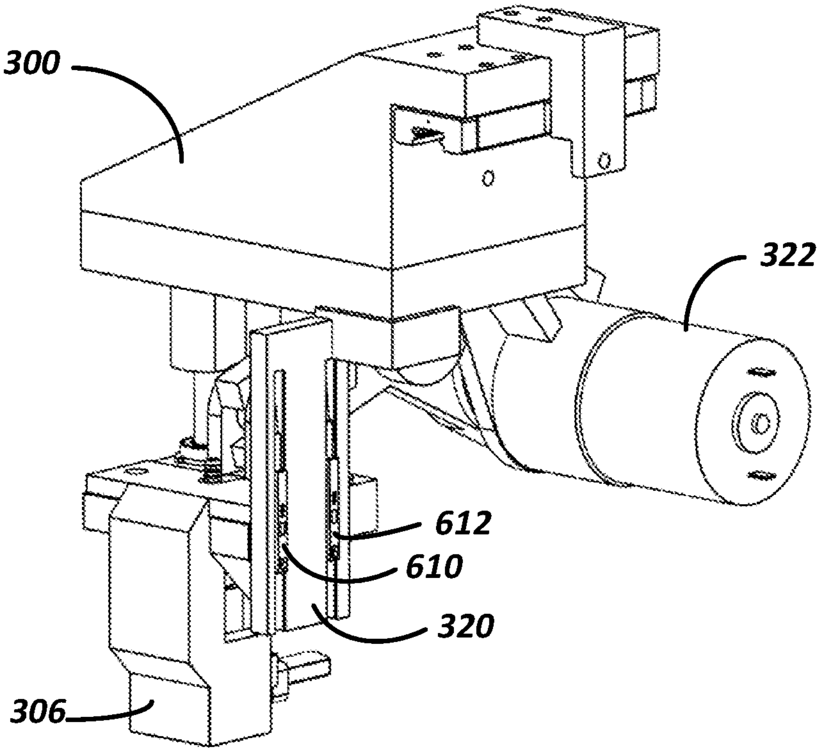
FIG. 7 is another perspective view of the needle actuator assembly from a different angle and showing a sensor mounting bracket for supporting a needle-up sensor and a needle-down sensor.
Figure 8:
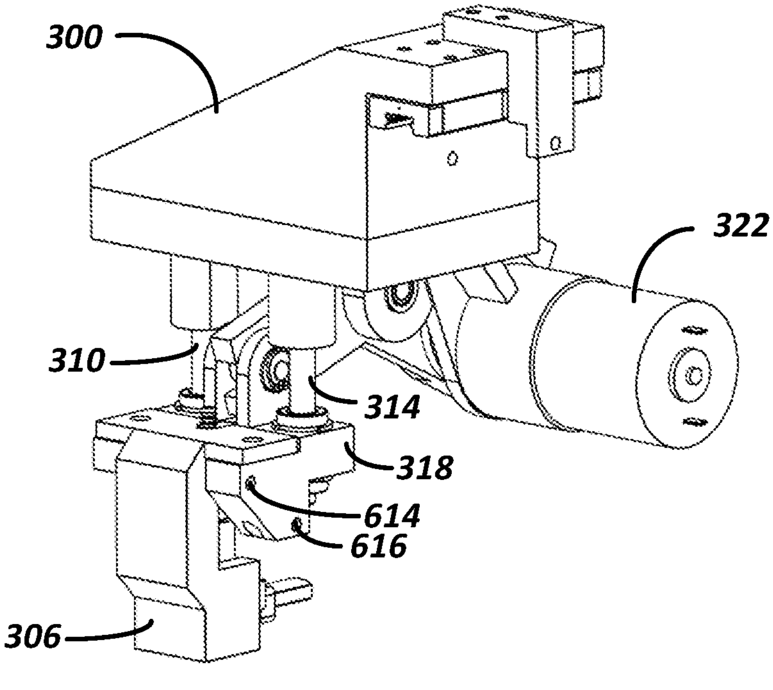
FIG. 8 is a view similar to that of FIG. 7 but with the sensor mounting bracket removed.

FIGS. 7 and 8 show needle actuator assembly 214 from a different angle. In FIG. 7, sensor support bracket 320 is included. In contrast, in FIG. 8, sensor support bracket 320 is omitted so that needle down magnet 614 and needle up magnet 616 are visible.

Figure 9:
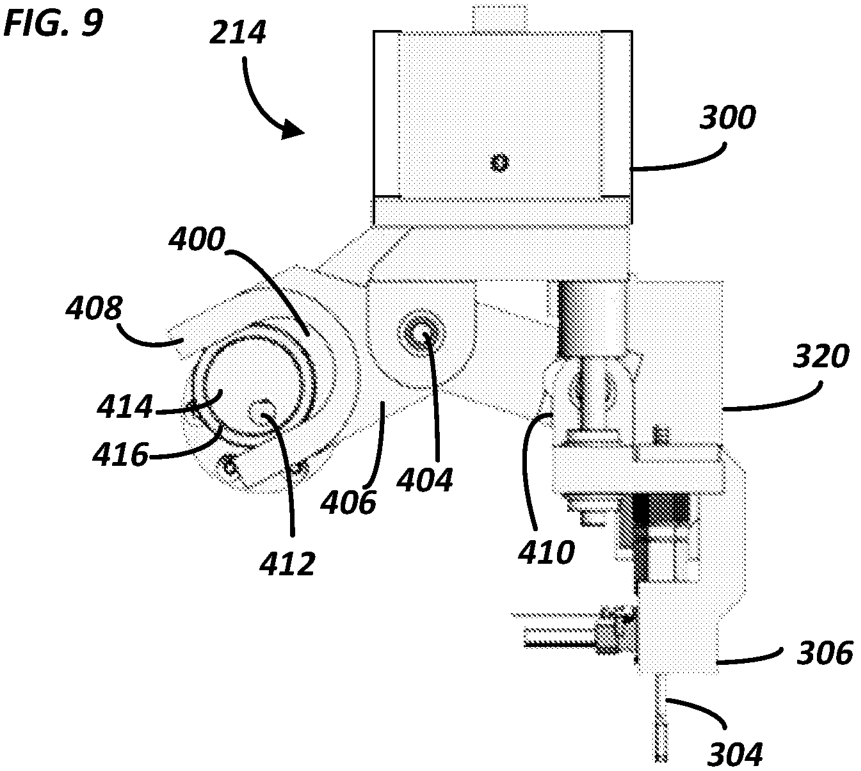
FIG. 9 is a side view of the needle actuator assembly, similar to FIG. 4, and showing the needle in the full-down, or lowered, position.
Figure 10:
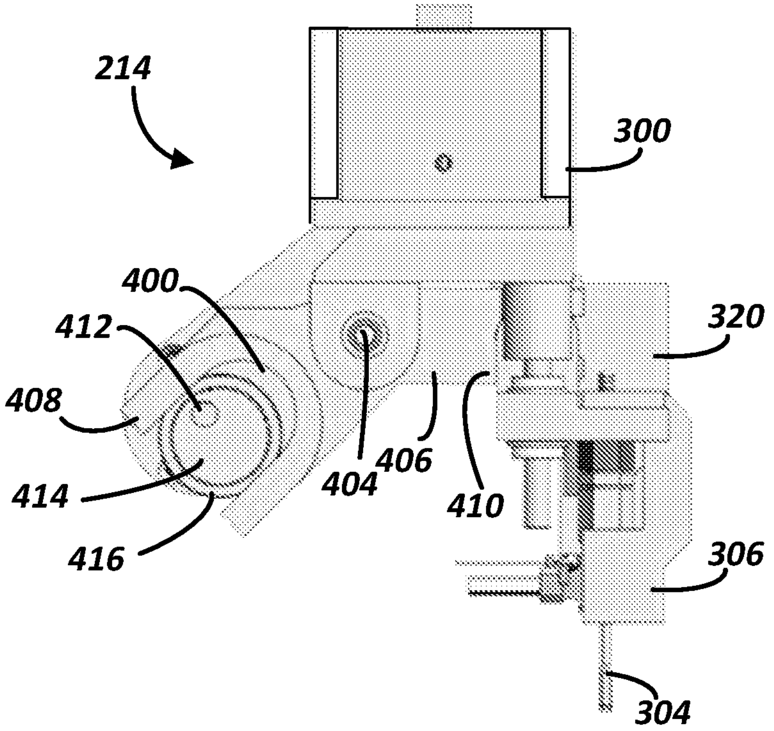
FIG. 10 is a side view of the needle actuator assembly similar to FIG. 9 but showing the needle in the full-up, or raised, position.

FIGS. 9 and 10 are comparative views of needle actuator assembly 214 in its lowered, and raised, positions, respectively. In FIG. 9, needle 304 is fully lowered, and in FIG. 10, needle 304 is fully raised. Gearmotor driveshaft 412 rotates about its axis by approximately 180 degrees as between FIG. 9 and FIG. 10. In FIG. 9, cam 414 is positioned to raise the yoke formed in first end 408 of pivot arm 406. As a result, second end 410 of pivot arm 406 is lowered for lowering needle support bracket 306 and needle 304 to the level for filling a cartridge.

In contrast, in FIG. 10, driveshaft 412 has rotated counter-clockwise through an angle of approximately 180 degrees, and cam 414 forces yoke 408 downward, causing second end 410 of pivot arm 406 upward, thereby raising needle support bracket and needle 304. Starting from the position shown in FIG. 9, to raise needle 304, driveshaft 412 and cam 414 are rotated in a counter-clockwise direction for approximately 180 degrees until reaching the configuration shown in FIG. 10. Alternatively, starting from the position shown in FIG. 10, to lower needle 304, driveshaft 412 and cam 414 are rotated in clockwise direction for approximately 180 degrees until reaching the configuration shown in FIG. 9.

In an alternate embodiment, it is possible to operate needle actuator assembly 214 by continuously rotating driveshaft 412 and cam 414 in a single angular direction, e.g., always clockwise, or always counter-clockwise, in increments of 180 degrees. In this case, cam limiter 400 would be removed from yoke 408 to avoid interference with the free rotation of cam 414. However, the use of cam limiter 400, and the reversal of the angular direction of rotation of cam 414, provides certain advantages in the preferred embodiment shown in FIGS. 9 and 10. It can be difficult to quickly stop cam 414, pivot arm 406, and needle bracket 306 at the desired fully-raised, and fully-lowered positions, due to the momentum developed by such components when moving between the raised, and lowered positions. By including cam limiter 400 in yoke 408, further rotation of cam 414 (and further movement of pivot rod 406 and needle bracket 306) is retarded once cam 414 (and surrounding bearing ring 416) have rotated into contact with cam limiter 400. This is true both: a) when cam 414 attempts to rotate further in the clockwise direction after reaching the fully-lowered position shown in FIG. 9; and b) when cam 414 attempts to rotate further in the counter-clockwise direction after reaching the fully-raised position shown in FIG. 10. This arrangement ensures that needle actuator assembly 214 can repeatably, reliably, and quickly stop at the fully-lowered, and fully-raised positions.

Another aspect of the present invention relates to a method for raising and lowering dispensing needle 304 for dispensing fluid into a number of containers. Referring again to FIGS. 3-10, one embodiment of such method includes the step of providing motor 322 having driveshaft 412. The method includes securing eccentric cam 414 to driveshaft 412. The method also includes the step of supporting pivot arm 406 for rotational movement about a pivot axis represented by pivot axle 404. The method also includes engaging first end 408 of pivot arm 406 with eccentric cam 414; preferably, first end 408 of pivot arm 406 includes a yoke for engaging eccentric cam 414.

The aforementioned method also includes securing dispensing needle 304 to a needle support bracket 306, and supporting needle support bracket 306 for sliding movement along a substantially vertical axis, e.g., along guide shafts 310 and 317. The aforementioned method also includes engaging second end 410 of pivot arm 406 with needle support bracket 306, e.g., by way of plunger mount 318. Motor 322 is then operated to rotate eccentric cam 414 between a first rotational position (the needle-up position of FIG. 10) and a second rotational position (the needle-down position of FIG. 9). Movement of eccentric cam 414 from the first rotational position (FIG. 10) to the second rotational position (FIG. 9) causes pivot arm 406 to rotate in a first direction for lowering second end 410 of pivot arm 406 to lower needle 304, and movement of eccentric cam 414 from the second rotational position (FIG. 9) to the first rotational position (FIG. 10) causes pivot arm 406 to rotate in the second, opposite direction for raising second end 410 of pivot arm 406 to raise needle 304. As shown in FIGS. 9 and 10, the first and second rotational positions may be approximately 180 degrees apart from each other. In the preferred embodiment of such method, motor 322 is operated to rotate eccentric cam 414 in a first rotational direction when rotating from the first rotational position (FIG. 10) to the second rotational position (FIG. 9); motor 322 is operated to rotate eccentric cam 414 in a second, opposite rotational direction when rotating from the second rotational position (FIG. 9) back to the first rotational position (FIG. 10).

The aforementioned method may also include the step of limiting advancement of eccentric cam 414 toward the pivot axis of pivot arm 406, and thereby limiting further rotation of the eccentric cam, as the eccentric cam reaches the first rotational position for raising the second end of the pivot arm to raise the needle.

Figure 11:
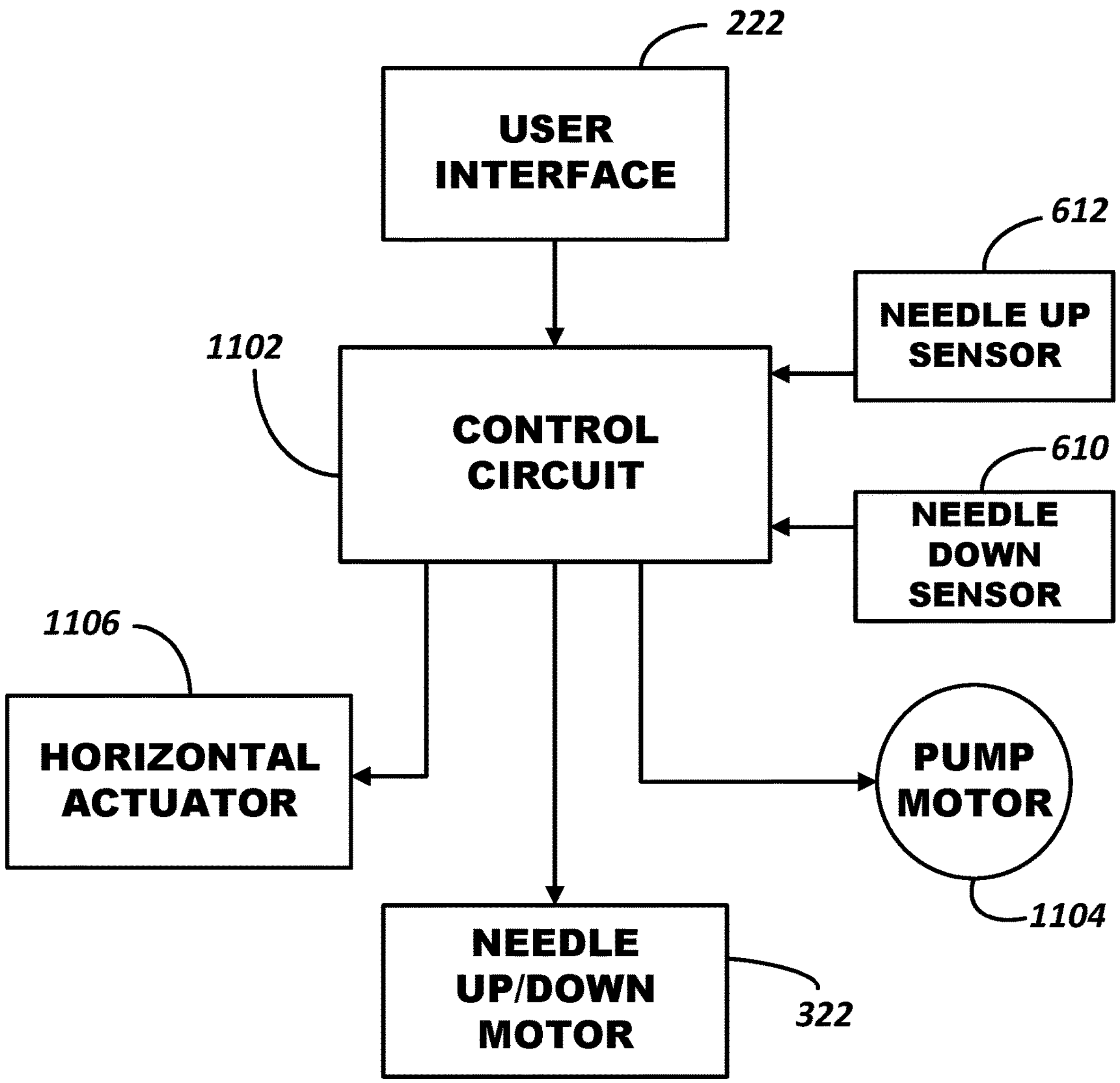
FIG. 11 is a block diagram showing the major components relating to the raising and lowering of the filling needle.

Now turning to FIG. 11, a block diagram is shown for controlling the operation of automated cartridge filling machine 200 incorporating needle actuator assembly 214. User interface 222 (see FIG. 2) allows a user to program filling machine 200 to indicate the type/capacity of cartridges being filled. The information entered by the user is provided to a control circuit 1102 which may include a microprocessor, memory storage, and input/output terminals. One of the input terminals of control circuit 1102 is coupled to needle-up sensor 612 (see FIG. 6) for detecting whether needle 304 has been fully-raised. Another input terminal of control circuit 1102 is coupled to needle-down sensor 610 (see FIG. 6) for detecting whether needle 304 has been fully-lowered.

One of the output terminals of control circuit 1102 of FIG. 11 is coupled to horizontal actuator block 1106. As noted earlier in the description of FIG. 2, filling machine 200 includes a carriage driven by Y-axis motor 216 and X-axis motor 218 for moving needle actuator assembly 214 in a horizontal X-Y plane from one cartridge to another; horizontal actuator block 1106 controls Y-axis motor 216 and X-axis motor 218 for selectively moving needle actuator assembly 214 from one cartridge to the next. Another output terminal of control circuit 1102 is coupled to gearmotor 322 of needle actuator assembly 214 for signaling that gearmotor 322 should rotate, and in which direction. In addition, another output terminal of control circuit 1102 is coupled to pump motor 1104; pump motor 1104 is included within fluid pump 212 shown in FIG. 2, and pump motor 1104 is operated at those times when fluid should be dispensed from fluid pump 212 to dispensing needle 304.

Figure 12:
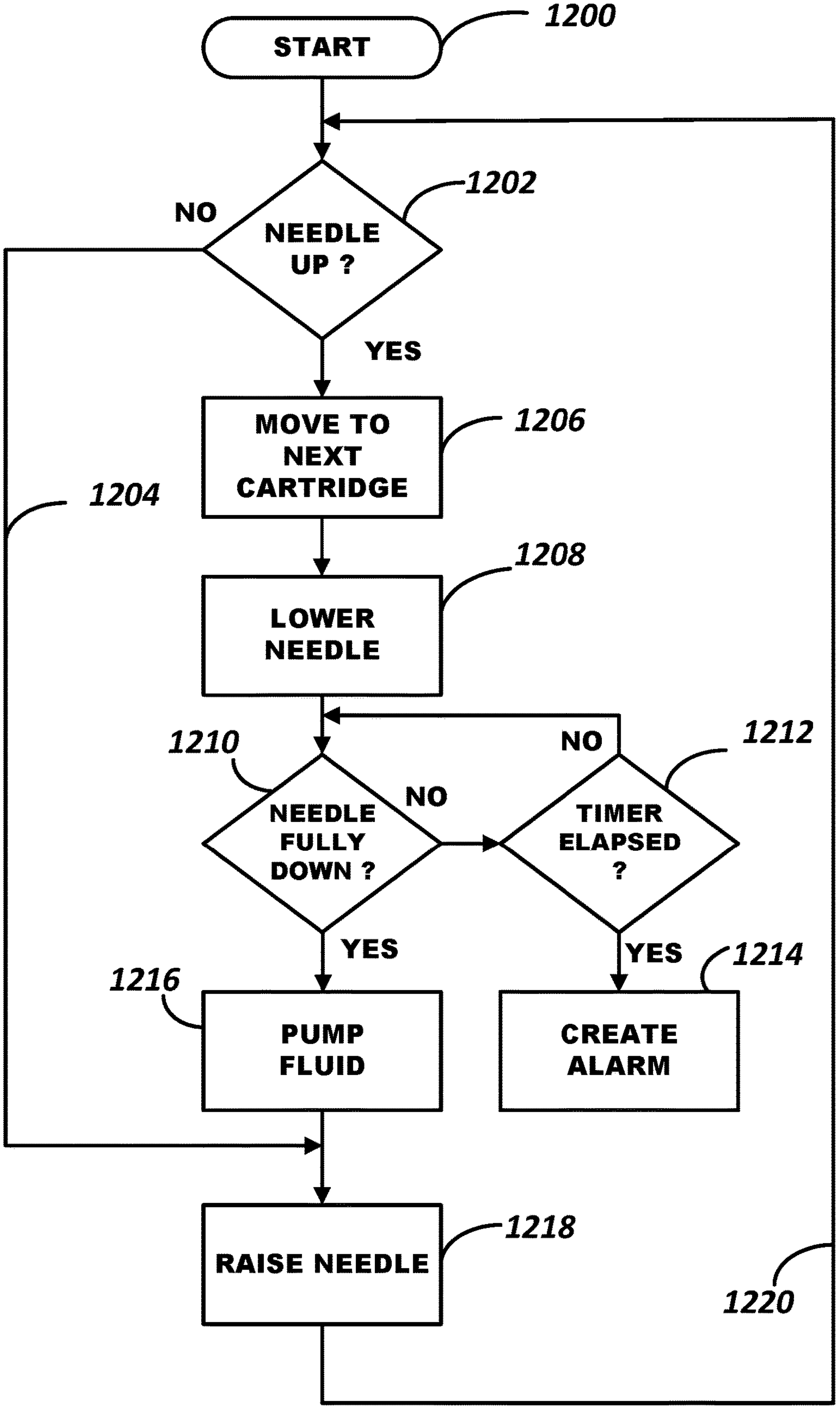
FIG. 12 is a simplified flowchart illustrating the control steps performed in raising and lowering the filling needle.

The operation of the control circuit 1102 of FIG. 11 is best explained in conjunction with the flowchart of FIG. 12. At Start step 1200, filling machine 200 takes note of information provided by the user via user interface 222. Control then proceeds to step 1202 to check whether needle 304 is in its fully-raised position; movement of needle actuator assembly 214 in the X-Y plane is permitted only when needle 304 is fully-raised. If the needle-up sensor 612 is not confirming that the needle is fully-raised, then control flows along line 1204 in FIG. 12 to block 1218 to trigger gearmotor 322 to raise needle 304. Control then flows back to step 1202 via line 1220 to confirm that needle 304 has been fully-raised. Once needle 304 is fully raised, control flows to block 1206 for triggering horizontal actuator block 1106 to move needle actuator assembly 214 to the first, or next, cartridge to be filled. After advancing to the appropriate cartridge in the X-Y horizontal plane, control passes to block 1208 for triggering gearmotor 322 to lower needle 304 toward the selected cartridge.

Still referring to FIG. 12, at step 1210, control circuit 1102 checks needle-down sensor 610 to determine whether needle 304 has been fully-lowered. If not, control passes to step 1212 to determine whether a selected time period has elapsed sufficient to lower the needle; if not enough time has elapsed, step 1210 is repeated. However, if sufficient time has elapsed and needle 304 has still not fully-lowered, this indicates that the needle has likely impacted an obstacle (e.g., the sidewall of a cartridge). In that case, control passes to block 1214 for creating an alarm and further operation is suspended until the problem is resolved by the user.

Referring again to FIG. 12, if block 1210 confirms that needle 304 has been fully lowered, then control passes to block 1216, and control circuit 1102 triggers the operation of fluid pump motor 1104 to pump fluid through needle 304 into the cartridge into which needle 304 has been lowered. The duration of this pump cycle is a function of the type/capacity of the cartridge as initially programmed by the user via user interface 222. After sufficient fluid has been pumped through needle 304 to fill the cartridge, control passes to step 1218, at which control circuit 1102 signals gearmotor 322 to raise needle 304 before indexing to the location of the next cartridge to be filled. Control then passes back to decision step 1202 to confirm that needle 304 has been fully-raised before triggering horizontal actuator 1106 to index needle actuator assembly 214 to the next cartridge location.

In view of the foregoing description, it will be appreciated that filling machine 200 (see FIG. 2) provides an apparatus for dispensing a fluid into a series of containers 102 (see FIG. 1) and includes a source of fluid 208 and a dispensing pump 212 having an inlet coupled to fluid source 208, as well as an outlet for pumping fluid to dispensing needle 304 in order to dispense fluid into one of the containers 102. Needle actuator assembly 214 moves needle 304 between a raised position (FIG. 10) and a lowered position (FIG. 9). First sensor 610 serves to detect that needle 304 has been moved to its lowered position, and control circuit 1102 is responsive to first sensor 610 to control fluid dispensing pump 212 (and its pump motor 1104) to prevent dispensing pump 212 from pumping fluid to needle 304 unless needle 304 has been moved to its lowered position. As shown in FIGS. 6 and 8, first sensor 610 can be responsive to first magnet 614 supported by plunger mount 318 for movement along with needle support bracket 306 and needle 304. In this manner, first sensor 610 is adapted to sense that first magnet 614 lies proximate to first sensor 610, corresponding to needle 304 being in its fully-lowered position.

As already noted above, needle actuator assembly 214 moves needle 304 along a substantially vertical axis, for example, upwardly and downwardly along guide shafts 310 and 314. As has also been explained above, filling machine 200 includes horizontal actuator 1106, which may include Y-axis motor 216 and X-axis motor 218, and related drive belts, for moving needle actuator assembly 214 within a horizontal plane for movement between containers 102, thereby moving needle actuator assembly 214 along horizontal x-y coordinates in order to sequentially position dispensing needle 304 over each cartridge in the array 102 of cartridges.

It has been further explained that second sensor 612 is included for sensing that needle 304 has been moved to its fully-raised position. Control circuit 1102 controls horizontal actuator 1106 and is responsive to second sensor 612 for preventing horizontal actuator 1106 from moving needle actuator assembly 214 in the horizontal plane unless needle 304 has first been fully raised. In this regard, second sensor 612 can be responsive to second magnet 616 supported by plunger mount 318 for movement along with needle support bracket 306 and needle 304. In this manner, second sensor 610 is adapted to sense that second magnet 616 lies proximate to second sensor 612, corresponding to needle 304 being in its fully-raised position.

Those skilled in the art will appreciate that an improved filling machine apparatus has been described for raising and lowering a fluid dispensing needle in a quick, repeatable and reliable manner to help maximize production rates achieved by the filling machine. The disclosed machine positively establishes that the dispensing needle has been fully-lowered before allowing fluid to be dispensed, thereby avoiding inadvertent application of fluid outside the containers to be filled along with the resulting mess and associated delays of cleaning the filling machine. In addition, the disclosed filling machine apparatus confirms that the dispensing needle has been fully-raised before attempting to move the needle actuator assembly to the next succeeding fluid cartridge, thereby avoiding situations wherein the dispensing needle is still inserted within a first cartridge when attempting to move to a second cartridge.

In addition, those skilled in the art will appreciate that a method has been disclosed for quickly raising and lowering a dispensing needle of a filling machine wherein an eccentric cam is secured to a motor driveshaft for rocking a pivot arm, and engaging the pivot arm with a needle support bracket for raising and lowering the dispensing needle. The motor can be operated in a first direction to raise the needle, and in a second direction to lower the needle. The method may also include limiting advancement of the eccentric cam beyond specified limits of rotation to positively stop the eccentric cam, pivot arm, and dispensing needle, at a fully-raised position, and at a fully-lowered position.

The embodiments specifically illustrated and/or described herein are provided merely to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

I claim:

1. Apparatus for raising and lowering a needle used to dispense a fluid into a plurality of containers, the apparatus comprising:

a) a frame;

b) a pivot arm rotatably coupled to the frame about a pivot axis, the pivot arm having first and second opposing ends, the pivot axis being located between the first and second opposing ends of the pivot arm for allowing the pivot arm to rock back and forth about its pivot axis, wherein upward movement of the first end of the pivot arm is accompanied by downward movement of the second end of the pivot arm;

c) a dispensing needle coupled to the pivot arm proximate the second end of the pivot arm for movement therewith, the dispensing needle moving upward and downward as the pivot arm rocks back and forth;

d) a motor supported by the frame, the motor including a rotatable motor shaft;

e) a cam coupled to the rotatable motor shaft for being rotated by the motor, the cam engaging a first end of the pivot arm for causing the pivot arm to rotate about its pivot axis;

whereby operation of the motor rotates the cam and moves the pivot arm to raise and lower the needle.

2. The apparatus of claim 1 wherein the dispensing needle is coupled to the second end of the pivot arm opposite the first end of the pivot arm.

3. The apparatus of claim 2 further including:

a) a first vertical guide post secured to the frame; and b) a needle support bracket for supporting the dispensing needle, the needle support bracket slidingly engaging the first vertical guide post for movement along the first vertical guide post, the needle support bracket being coupled to the second end of the pivot arm for being raised and lowered thereby.

4. The apparatus of claim 3 further including a second vertical guide post secured to the frame, wherein the needle support bracket slidingly engages the second vertical guide post for movement along the second vertical guide post.

5. Apparatus for raising and lowering a needle used to dispense a fluid into a plurality of containers, the apparatus comprising:

a) a frame;

b) a pivot arm rotatably coupled to the frame about a pivot axis, the pivot arm having first and second opposing ends, the pivot axis being located between the first and second opposing ends of the pivot arm;

c) a dispensing needle coupled to the pivot arm for movement therewith, the dispensing needle being coupled to the second end of the pivot arm opposite the first end of the pivot arm;

d) a motor supported by the frame, the motor including a rotatable motor shaft;

e) a cam coupled to the rotatable motor shaft for being rotated by the motor, the cam engaging a first end of the pivot arm for causing the pivot arm to rotate about its pivot axis;

whereby operation of the motor rotates the cam and moves the pivot arm to raise and lower the needle;

wherein:

a) the cam has a circular periphery;

b) the cam is eccentrically mounted to the rotatable motor shaft; and c) the first end of the pivot arm includes a yoke for receiving the cam.

6. The apparatus of claim 5 further including a circular bearing surrounding the cam for allowing the cam to rotate within the circular bearing, the circular bearing being slidingly received within the yoke of the pivot arm.

7. The apparatus of claim 6 further including a cam limiter, the cam limiter being disposed within the yoke of the pivot arm, the cam limiter having an arcuate engagement surface adapted to engage the circular bearing for limiting sliding movement of the circular bearing toward the pivot axis of the pivot arm, thereby limiting further rotation of the cam, and stopping further movement of the dispensing needle.

8. A method for raising and lowering a needle used to dispense a fluid into a plurality of containers, the method comprising the steps of:

a) providing a motor having a driveshaft;

b) securing an eccentric cam to the driveshaft;

c) supporting a pivot arm for rotational movement about a pivot axis, the pivot arm having first and second opposing ends, the pivot axis being located between the first and second opposing ends of the pivot arm for allowing the pivot arm to rock back and forth about the pivot axis, wherein upward movement of the first end of the pivot arm is accompanied by downward movement of the second end of the pivot arm;

d) engaging a first end of the pivot arm with the eccentric cam;

e) securing the needle to a needle support bracket;

f) supporting the needle support bracket for upward and downward sliding movement along a substantially vertical axis;

g) engaging the second end of the pivot arm with the needle support bracket for moving the needle support bracket upwardly and downwardly therewith as the pivot arm rocks back and forth; and h) operating the motor to rotate the eccentric cam between a first rotational position and a second rotational position, movement of the eccentric cam from the first rotational position to the second rotational position causing the pivot arm to rotate about its pivot axis in a first direction for lowering the second end of the pivot arm to lower the needle, and movement of the eccentric cam from the second rotational position to the first rotational position causing the pivot arm to rotate about its pivot axis in a second direction, opposite to the first direction, for raising the second end of the pivot arm to raise the needle.

9. The method of claim 8 wherein the first rotational position and second rotational position are approximately 180 degrees apart from each other.

10. The method of claim 8 wherein the step of operating the motor includes rotating the eccentric cam in a first rotational direction when rotating from the first rotational position to the second rotational position, and wherein the step of operating the motor includes rotating the eccentric cam in a second rotational direction, opposite to the first rotational direction, when rotating from the second rotational position back to the first rotational position.

11. A method for raising and lowering a needle used to dispense a fluid into a plurality of containers, the method comprising the steps of:

a) providing a motor having a driveshaft;

b) securing an eccentric cam to the driveshaft;

c) supporting a pivot arm for rotational movement about a pivot axis, the pivot arm having first and second opposing ends;

d) engaging a first end of the pivot arm with the eccentric cam;

e) securing the needle to a needle support bracket;

f) supporting the needle support bracket for sliding movement along a substantially vertical axis;

g) engaging a second end of the pivot arm with the needle support bracket; and h) operating the motor to rotate the eccentric cam between a first rotational position and a second rotational position, movement of the eccentric cam from the first rotational position to the second rotational position causing the pivot arm to rotate in a first direction for lowering the second end of the pivot arm to lower the needle, and movement of the eccentric cam from the second rotational position to the first rotational position causing the pivot arm to rotate in a second direction, opposite to the first direction, for raising the second end of the pivot arm to raise the needle;

wherein said method further includes the step of engaging the eccentric cam within a yoke formed within the first end of the pivot arm.

12. The method of claim 11 including the step of limiting advancement of the eccentric cam toward the pivot axis of the pivot arm, and thereby limiting further rotation of the eccentric cam, as the eccentric cam reaches the first rotational position, and as the eccentric cam reaches the second rotational position.

* * * * *